(12) United States Patent
Nakamura et al.

(10) Patent No.: US 8,882,950 B2
(45) Date of Patent: Nov. 11, 2014

(54) PREPREG WINDING METHOD AND APPARATUS

(75) Inventors: Takato Nakamura, Saitama (JP); Norio Matsumoto, Saitama (JP); Naoki Kimoto, Saitama (JP)

(73) Assignee: Fujikura Rubber Ltd., Tokyo (JP)

( * ) Notice: Subject to any disclaimer, the term of this patent is extended or adjusted under 35 U.S.C. 154(b) by 234 days.

(21) Appl. No.: 13/517,300

(22) PCT Filed: May 28, 2010

(86) PCT No.: PCT/JP2010/059076
§ 371 (c)(1),
(2), (4) Date: Jun. 20, 2012

(87) PCT Pub. No.: WO2011/077769
PCT Pub. Date: Jun. 30, 2011

(65) Prior Publication Data
US 2012/0247652 A1    Oct. 4, 2012

(30) Foreign Application Priority Data
Dec. 24, 2009   (JP) ................................. 2009-292128

(51) Int. Cl.
*B29C 70/00* (2006.01)
*B29C 53/56* (2006.01)
*B29K 105/06* (2006.01)

(52) U.S. Cl.
CPC ........... *B29C 53/562* (2013.01); *B29K 2105/06* (2013.01)
USPC ........... 156/189; 156/191; 156/195; 156/425; 156/446

(58) Field of Classification Search
USPC .......................... 156/191, 189, 195, 446, 425
See application file for complete search history.

(56) References Cited

U.S. PATENT DOCUMENTS

| 4,319,750 | A | * | 3/1982 | Roy ............................... 473/320 |
| 4,938,824 | A | * | 7/1990 | Youngkeit ...................... 156/173 |
| 4,963,301 | A | * | 10/1990 | Davis et al. ................... 264/29.7 |

(Continued)

FOREIGN PATENT DOCUMENTS

| JP | 57-063223 | A |   | 4/1982 |
| JP | 63-017033 | A |   | 1/1988 |
| JP | 63-17033 | A | * | 1/1988 |

(Continued)

OTHER PUBLICATIONS

International Search Report for PCT/JP2010/059076 dated Jul. 27, 2010.

*Primary Examiner* — Jeff Aftergut
(74) *Attorney, Agent, or Firm* — McCormick Paulding & Huber LLP

(57) ABSTRACT

A prepreg winding method includes the steps of preparing a plate, a mandrel movable toward and away from the plate, and a press roll movable toward and away from the mandrel and having an axis parallel to the mandrel; mounting a prepreg on the plate, the prepreg being formed by impregnating reinforced fibers with a thermosetting resin sheet; winding a leading end of the prepreg mounted on the plate around the mandrel, and making a pressing force act on the plate and the mandrel therebetween with the prepreg sandwiched between the plate and the mandrel and making a pressing force act on the mandrel and the press roll therebetween with the prepreg sandwiched between the mandrel and the press roll; and winding the prepreg around the mandrel by rotating the mandrel and the press roll.

6 Claims, 8 Drawing Sheets

(56) References Cited

U.S. PATENT DOCUMENTS

| | | | |
|---|---|---|---|
| 5,262,118 A | 11/1993 | Fukushima et al. | |
| 5,348,603 A * | 9/1994 | Yorgason | 156/191 |
| 5,840,347 A * | 11/1998 | Muramatsu et al. | 425/393 |
| 6,261,500 B1 * | 7/2001 | Park et al. | 264/258 |
| 8,066,838 B1 * | 11/2011 | Burger | 156/188 |

FOREIGN PATENT DOCUMENTS

| | | |
|---|---|---|
| JP | 05-069492 A | 3/1993 |
| JP | 2000-127254 A | 5/2000 |
| JP | 2001-096635 A | 4/2001 |
| JP | 2003-118007 A | 4/2003 |
| JP | 2006-062355 A | 3/2006 |

* cited by examiner

PREPREG WINDING METHOD AND APPARATUS

CROSS REFERENCE TO RELATED APPLICATIONS

This application claims the priority of Japanese patent application No. 2009-292128, filed on Dec. 24, 2009 and PCT Application No. PCT/JP2010/059076, filed on May 28, 2010, the disclosures of which are incorporated herein by reference in their entirety.

TECHNICAL FIELD

The present invention relates to a prepreg winding method and apparatus.

BACKGROUND ART

In recent years, FRP (Fiber Reinforced Plastics) cylinders have been used in various industrial fields. A filament winding method, as disclosed in Japanese Unexamined Patent Publication No. 2006-62355 in which carbon fibers are wound around a mandrel while being impregnated with a resin is known in the art as a method for producing an FRP cylinder. A prepreg method, as disclosed in Japanese Unexamined Patent Publication No. 2001-96635 in which a plurality of prepregs, each of which is made from carbon fibers impregnated with a thermosetting resin sheet, are wound and thermally cured to be formed as a plurality of FRP layers, is also known in the art as a method for producing an FRP cylinder.

TECHNICAL PROBLEM

However, an FRP cylinder produced according to the filament winding method requires more than a predetermined quantity of resin and there is an upper limit in volume content of carbon fibers, thus having a problem of not being capable of sufficiently meeting the demands for weight reduction and strength improvement of the FRP cylinder.

On the other hand, an FRP cylinder produced according to the prepreg method generally has the feature of being capable of increasing the volume content of carbon fibers even with a minimum necessary amount of resin, thus being advantageous in achieving weight reduction and strength improvement of the FRP cylinder at the same time. The applicant of the present invention has proposed an FRP cylinder using prepregs having a strength that enables the FRP cylinder to be used as a propeller shaft or a drive shaft for an automobile (two wheeler) (Japanese Patent Application No. 2009-11142). However, in order to produce such an FRP cylinder, a new technical problem has arisen with regard to how to wind a prepreg into a multi-cylindrical shape without having creases or interlaminar gaps.

The present invention has been devised in view of the above described issues, and an object of the present invention is to provide a prepreg winding method and apparatus by which a prepreg can be efficiently wound into a multi-cylindrical shape without having creases or interlaminar gaps.

SUMMARY OF THE INVENTION

In an aspect of the prepreg winding method according to the present invention, the present invention includes a step of preparing a plate, a mandrel which is movable toward and away from the plate, and a press roll which is movable toward and away from the mandrel and has an axis parallel to the mandrel; a step of mounting a prepreg on the plate, the prepreg being formed by impregnating reinforced fibers with a thermosetting resin sheet; a step of winding a leading end of the prepreg mounted on the plate around the mandrel, and making a pressing force act on the plate and the mandrel therebetween with the prepreg sandwiched between the plate and the mandrel and making a pressing force act on the mandrel and the press roll therebetween with the prepreg sandwiched between the mandrel and the press roll; and a step of winding the prepreg around the mandrel by rotating the mandrel and the press roll by supplying a relative moving force between the plate and the mandrel with the mandrel and the press roll pressed against each other, the relative moving force acting in a direction orthogonal to the axis of the mandrel without intersecting the axis of the mandrel.

In the aforementioned Japanese Patent Application No. 2009-11142, the structure of an FRP cylinder made by layering a plurality of prepregs in advance the fiber directions of which are predetermined and thereafter winding these prepregs a plurality of turns has been proposed. In this aspect in which a plurality of prepregs layered in advance are wound a plurality of turns, it is practical for the prepreg to be a laminated prepreg made by layering a plurality of prepregs with a separating sheet interposed between adjacent prepregs, and wherein the prepreg winding method includes a step of removing the separating sheet during winding of the prepreg around the mandrel.

The mandrel is cylindrical in shape, in the simplest case; however, the present invention can also be applied to a tapered mandrel.

In an aspect of the prepreg winding apparatus according to the present invention, the present invention includes a plate having a mounting surface on which a prepreg formed by impregnating reinforced fibers with a thermosetting resin sheet is mounted; a mandrel supported to be rotatable with an axis thereof parallel to the prepreg mounting surface of the plate; a relative mandrel moving mechanism which moves the mandrel toward and away from the mounting surface of the plate; a press roll which maintains the axis thereof parallel to the axis of the mandrel and is movable toward and away from the mandrel; a relative press-roll raising/lowering mechanism which raises and lowers the press roll with respect to the plate and the mandrel; and a relative plate moving mechanism which moves the mandrel and the press roll relative to the plate in a direction orthogonal to the axis of the mandrel without intersecting the axis of the mandrel in a planar direction of the prepreg mounting surface.

It is desirable that the prepreg winding apparatus according to the present invention be further provided with a pressing force variable mechanism which varies a pressing force of the press roll against the mandrel.

It is desirable for the plate to be fixed to a machine casing, wherein a forward/rearward moving frame is supported by the machine casing thereon to be movable in a direction parallel to the prepreg mounting surface of the plate, and wherein the relative mandrel moving mechanism and the relative press-roll raising/lowering mechanism are supported by the forward/rearward moving frame.

It is desirable for a plurality of pressure rolls, which press the press roll toward the mandrel at different positions in a direction of the axis of the press roll, to be supported by the forward/rearward moving frame.

Effects of the Invention

According to the prepreg winding method and apparatus of the present invention, a prepreg can be efficiently wound into a multi-cylindrical shape without having creases or interlaminar gaps.

DESCRIPTION OF THE PREFERRED EMBODIMENTS

Figure 1:
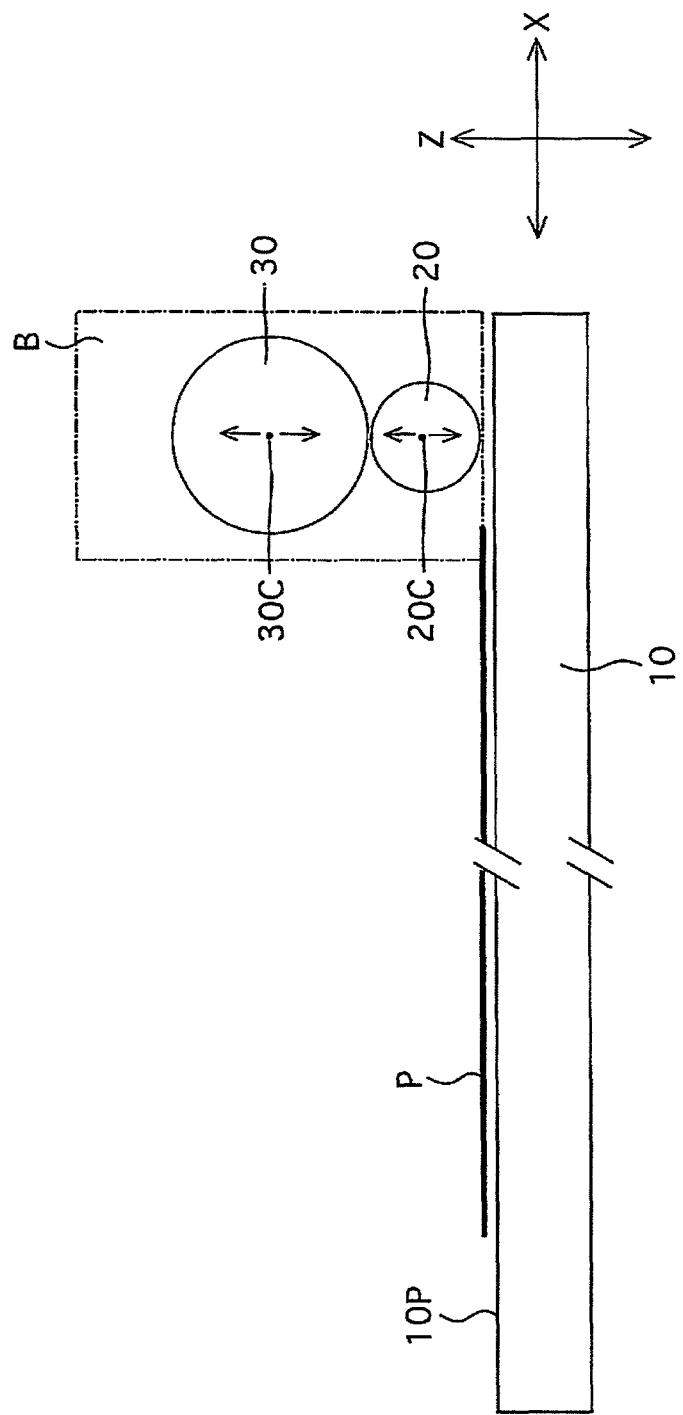
FIG. 1 is a side elevational view showing elements of an embodiment for implementing a prepreg winding method according to the present invention.

FIG. 1 is a figure showing the principle of an embodiment of a prepreg winding method according to the present invention. The fundamental elements for implementing the method according to the present invention are a plate 10, a mandrel 20 and a press roll 30. The mandrel 20 and the press roll 30 are positioned above the plate 10 in that order, held by a double-roll block B and movable relative to each other in a direction orthogonal to a prepreg mounting surface 10P of the plate 10 (vertical direction Z with respect to FIG. 1). The mandrel 20 can move toward and away from the plate 10 in the vertical direction Z and the press roll 30 can move toward and away from the mandrel 20 in the vertical direction Z. The mandrel 20 and the press roll 30 (the double-roll block B that holds the mandrel 20 and the press roll 30) and the plate 10 can reciprocate relative to each other in a predetermined direction (horizontal direction X with respect to FIG. 1) along the prepreg mounting surface 10P. An axis 20C of the mandrel 20 and an axis 30C of the press roll 30 that are parallel to each other extend in a direction orthogonal to both the horizontal direction X and the vertical direction Z with respect to FIG. 1 and are positioned to extend orthogonally to the horizontal direction X without intersecting the horizontal direction X on the prepreg mounting surface 10P. The mandrel 20 is formed from a metal columnar material and the press roll 30 is formed from an elastic material such as rubber. Although the mandrel 20 and the press roll 30 are rotatable, no active rotational force is given thereto.

Steps for winding the prepreg P around the mandrel 20 by the above described components will be hereinafter discussed with reference to FIG. 2.

Figure 2A:
FIG. 2 illustrate process drawings showing an embodiment of the prepreg winding method according to the present invention.
Figure 2B:
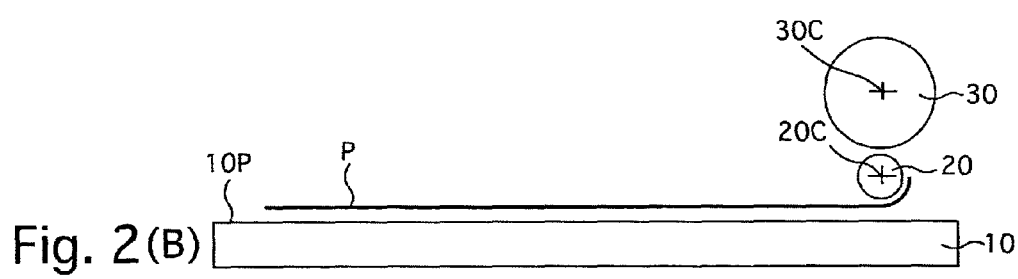
Figure 2C:
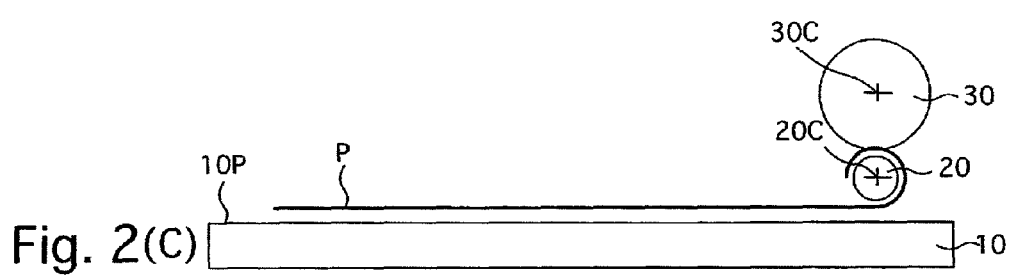
Figure 2D:
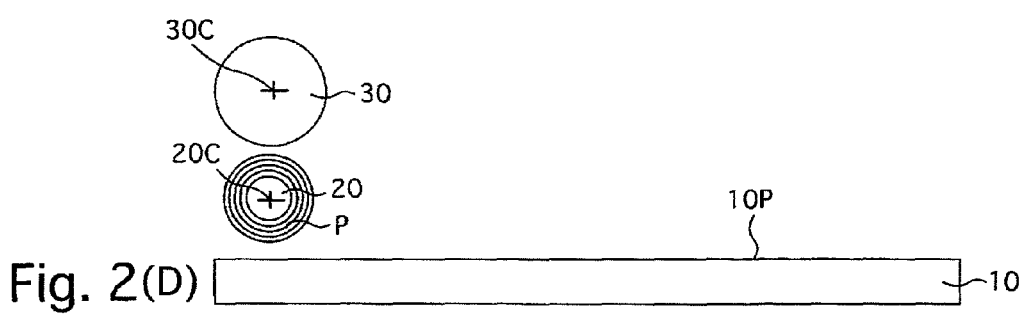

(1) The prepreg P in the shape of a rectangle in plan view is placed on the prepreg mounting surface 10P of the plate 10 (FIG. 2(A)). At this stage, the leading end side of the prepreg P is made to be parallel to the axis 20C of the mandrel 20; namely, the left and right end sides of the prepreg P are orientated orthogonal to the axis 20C of the mandrel 20 without intersecting the axis 20C. Upon completion of this setting of the prepreg P, the plate 10 is made to move rightward relative to the mandrel 20 and the press roll 30 (the double-roll block B) with the plate 10 and the mandrel 20 brought in contact with each other and with the mandrel 20 and the press roll 30 brought in contact with each other (FIG. 2(B)). Thereupon, the leading end (right end with respect to FIG. 2(A)) of the prepreg P on the prepreg mounting surface 10P of the plate 10 is wound around the mandrel 20 to come out between the mandrel 20 and the press roll 30 (FIG. 2(C)). This state is herein defined as an initial winding state. To complete this initial winding state, on an as needed basis, a worker performs a supplementary work making the plate 10 and the mandrel 20 or the mandrel 20 and the press roll 30 spaced from each other so that the leading end of the prepreg P winds around the mandrel 20.

(2) Upon completion of the above described initial winding, adjustments are made to the contact pressures between the plate 10 and the mandrel 20 and between the mandrel 20 and the press roll 30, and the plate 10 is made to move further rightward relative to the mandrel 20. Thereupon, the mandrel 20 rotates by a relative moving force produced between the mandrel 20 and the plate 10, and the rotational force of the mandrel 20 produces motion making the press roll 30 rotate. In this process, the prepreg P is totally wound around the mandrel 20 (FIG. 2(D)). No active (dynamic) rotational force is applied to the mandrel 20 or the press roll 30, whereas rotation is applied to the mandrel 20 and the press roll 30 by the frictional contacting forces between the plate 10 and the mandrel 20 and between the mandrel 20 and the press roll 30; hence, no creases occur on the prepreg P and no interlaminar gaps occur either.

(3) Subsequently, in a like manner, a necessary number of prepregs P are wound in layers to complete a cylindrical multilayered (laminated) prepreg. The cylindrical laminated prepreg thus completed is thermally cured and thereafter removed from the mandrel 20 to be provided as an FRP cylinder. When the layer-winding operation is performed, the winding commencement positions of the plurality of prepregs P can be made to be mutually different to be distributed in a circumferential direction.

Figure 3:
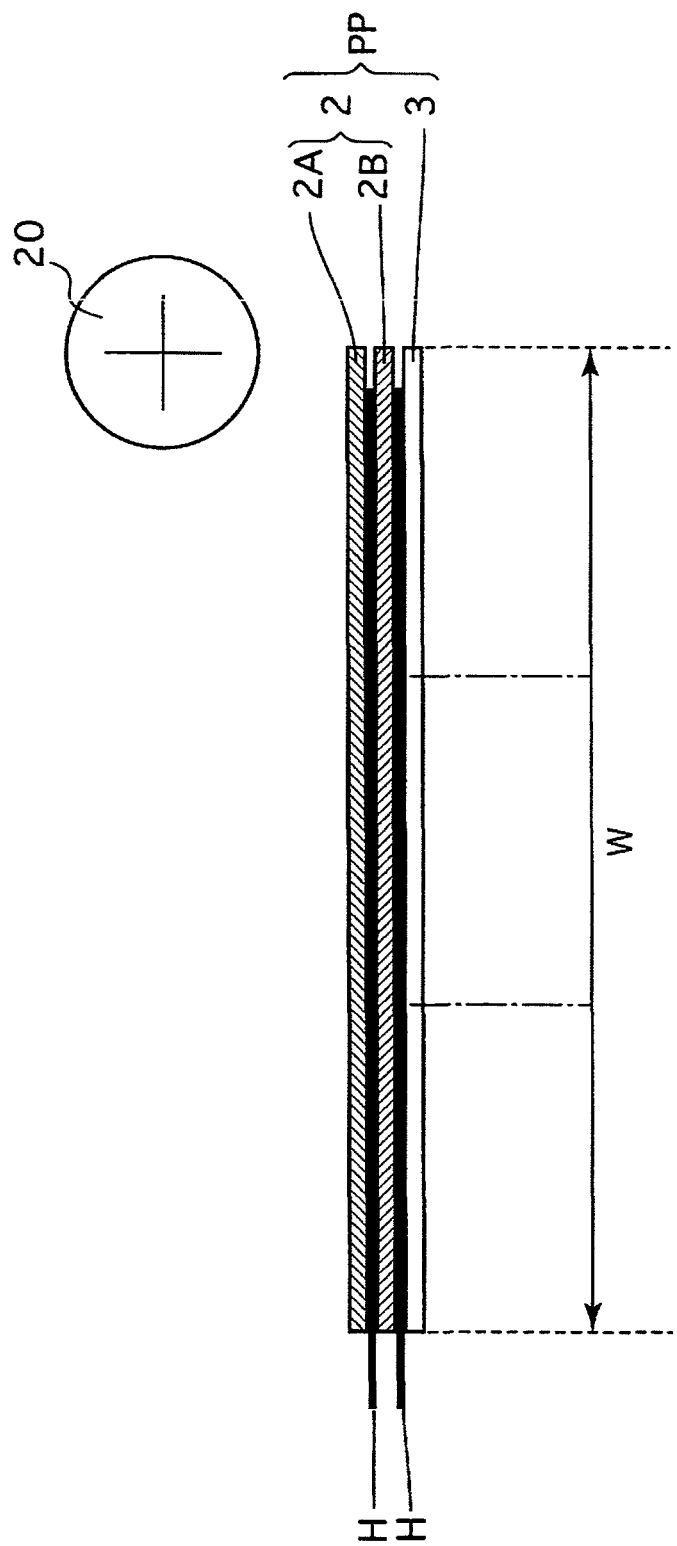
FIG. 3 is a diagram showing the structure of the prepreg shown in FIG. 1 in the case where it is made as a laminated prepreg.

(4) The present embodiment of the winding method is effective especially in using, as the prepreg P, a laminated (multilayered) prepreg (set prepreg) PP made from a plurality of prepregs layered in advance. As shown in FIG. 3, the laminated prepreg PP is prepared in advance with a separating sheet (separating paper) H sandwiched between adjacent prepregs P. The leading ends of the prepregs P of the laminated prepreg PP can be made to be aligned as shown in FIG. 3 or to be mutually different slightly in position so that the prepregs P are arranged into a stepped shape in the initial winding state on the mandrel 20. In addition, in the initial winding state, the leading ends (rights end with respect to FIG. 3) of the separating sheets H are positioned at positions not wound around the mandrel 20, while the trailing ends (left ends with respect to FIG. 3) of the same are made to have a length projecting from the prepregs P so as to ease the removal of the separating sheets H. A fluororesin (coating) sheet such as, e.g., a PTFE film or a PFA film can be used as each separating sheet H.

(5) The procedure to wind the laminated prepreg PP around the mandrel 20 is the same as the above described procedure. The only one operation to be added is an operation to extract (remove) the separating sheets H in the laminated prepreg PP during winding. If the laminated prepreg PP is wound around the mandrel 20 according to the above described winding method while the separating sheets H are being removed, a plurality of prepregs P in a laminated state can be securely wound around the mandrel 20 a plurality of turns (more than two turns) without having creases or interlaminar gaps.

Although the present embodiment does not concern the structure of each prepreg P that comprises the laminated prepreg PP, a specific embodiment proposed in Japanese Patent Application No. 2009-11142 will be discussed hereinafter.

The laminated prepreg PP that is shown in FIG. 3 consists of a torsional rigidity retaining prepreg 2 and a buckling prevention prepreg 3 that are layered with the separating sheets H being sandwiched between adjacent prepregs 2 and 3 in a layered state, wherein the torsional rigidity retaining prepreg 2 includes a layer of fibers oblique to the cylindrical axis direction and the buckling prevention prepreg 3 includes a layer of fibers orthogonal to the cylindrical axis direction.

Figure 4:
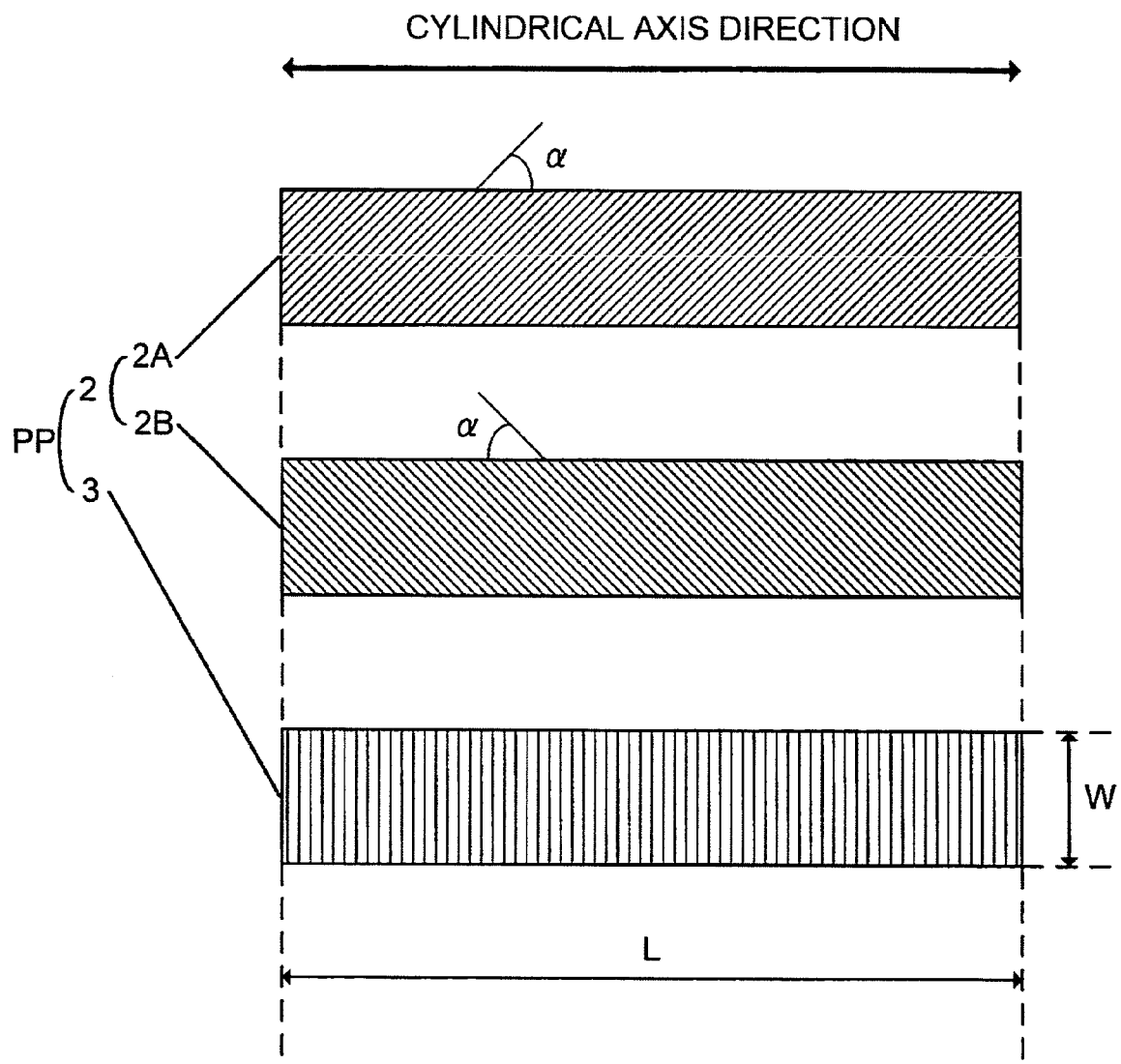
FIG. 4 is a diagram showing an example of the fiber direction of each prepreg contained in the laminated prepreg.

FIG. 4 illustrates a state before the torsional rigidity retaining prepreg 2 and the buckling prevention prepreg 3 are layered on each other to show the fiber direction of each of the torsional rigidity retaining prepreg 2 and the buckling prevention prepreg 3 that constitute the laminated prepreg PP. The torsional rigidity retaining prepreg 2 is composed of a pair of bias prepregs 2A and 2B, the filament fiber directions of which are oblique to the cylindrical axis direction at angles of $\pm\alpha$ degrees ($0<\alpha<90$). The angles $\alpha$ are, e.g., $\pm30$ degrees, $\pm45$ degrees or $\pm60$ degrees. The buckling prevention prepreg 3 is a hoop prepreg, the filament fiber direction of which is orthogonal to the cylindrical axis direction.

The width W of the laminated prepreg PP (the torsional rigidity retaining prepreg 2 and the buckling prevention prepreg 3) is set at approximately a little over three times the circumference of the laminated prepreg PP wound into a cylinder, and the laminated prepreg PP can be continuously wound three turns into a cylinder. Since the laminated prepreg PP consists of three prepregs: the pair of bias prepregs 2A and 2B and the hoop prepreg 3, the number of plies becomes nine in total by continuously winding the laminated prepreg PP three turns into a cylinder. Length L of the laminated prepreg PP is designed in accordance with the usage of the FRP cylinder and is an appropriate length smaller than the effective length of the mandrel 20.

Alumina fiber, aramid fiber, Tyranno Fiber, amorphous fiber, glass fiber or the like can be used, as an alternative to carbon fiber, as the reinforced fibers which are included in the various prepregs including the aforementioned torsional rigidity retaining prepreg 2 and buckling prevention prepreg 3. In other words, the thread type is basically not limited to a particular type.

In the case of a unidirectional fiber reinforced prepreg (i.e., prepreg in which the directions of filament fibers are aligned in one direction) such as the torsional rigidity retaining prepreg 2 (the pair of bias prepregs 2A and 2B) or the buckling prevention (hoop) prepreg 3, the thread thickness is desirably smaller than 24K (1K=1,000 filaments). If the thread thickness exceeds 24K, the prepreg may become excessively thick and a uniform fabric property may not be ensured; in addition, the workability of winding the prepreg around a mandrel during manufacturing may deteriorate.

The resin with which such a reinforced fabric is impregnated can be basically any type. For instance, epoxy resin, unsaturated polyester resin, phenolic resin, vinyl ester resin, peek resin, polyimide resin, or the like, can be used.

It is desirable that the weight of the prepreg be equal to or smaller than 300 g/m$^2$; more desirably, equal to or smaller than 250 g/m$^2$. If the weight exceeds 300 g/m$^2$, the prepreg becomes excessively thick, thus becoming difficult to wind around a mandrel during manufacturing. The amount of resin included in the prepreg is desirably in the range of 20 to 45 percent by weight; more desirably, 25 to 40 percent by weight. If the resin content is under 20 percent by weight, a shaft having a sufficient strength may not be able to be produced because of the excessively small amount of resin. If the resin content exceeds 45 percent by weight, the torsional rigidity may deteriorate compared to the case of a cylinder having the same weight.

The FRP cylinder that is configured by winding the laminated prepreg PP of the above and thereafter being thermally cured can be enhanced in strength with respect to torsional direction and buckling direction because the torsional rigidity retaining prepreg 2, which includes a layer of fibers oblique to the cylindrical axis direction, and the buckling prevention prepreg 3, which includes a layer of fibers orthogonal to the cylindrical axis direction, are continuously wound a plurality of turns in between a plurality of FRP layers comprising the body of the FRP cylinder.

In addition, since three prepregs, i.e., the pair of bias prepregs 2A and 2B and the hoop prepreg 3, are layered and then wound while being macroscopically regarded as a single prepreg (the laminated prepreg PP), the manifestation of the buckling prevention effect makes it possible to achieve a weight reduction and a strength improvement of the FRP cylinder at the same time, compared with the case where materials of the same weight are individually wound.

Next, an embodiment of a winding apparatus for implementing the prepreg winding method according to the present invention will be hereinafter discussed with reference to FIGS. 5 through 9. The plate 10, which is rectangular in plan view and the top of which is formed as the prepreg mounting surface 10P, and guide rails 12 which are positioned on both sides of the plate 10 are fixed onto a machine casing 11. A feed screw 14 which is parallel to the guide rails 12 and driven to rotate by a rotary drive system 13 is also supported on the machine casing 11. In the following descriptions, the axial directions of the guide rails 12 and the feed screw 14 will be referred to as the forward/rearward direction (X-direction).

A forward/rearward moving frame (double-roll block) 15 is supported by the guide rails 12 thereon to be movable, and a nut member 16 which is screw-engaged with the feed screw 14 is fixed to the forward/rearward moving frame 15. Accordingly, when the feed screw 14 is driven to rotate forward and reverse via the rotary drive system 13, the forward/rearward moving frame 15 reciprocally moves linearly in the X-direction along the guide rails 12. The guide rails 12, the rotary drive system 13, the feed screw 14 and the forward/rearward moving frame 15, which move the forward/rearward moving frame 15, constitute a relative plate moving mechanism which moves the forward/rearward moving frame 15 and the plate 10 relative to each other in the X-direction.

Figure 9:
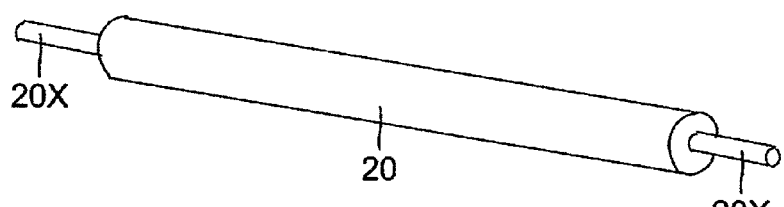
FIG. 9 is a perspective view of a mandrel alone.

A pair of cylindrical device brackets 21 which support the mandrel 20 in a manner to allow the mandrel 20 to move up and down is fixed to a lower part of the forward/rearward moving frame 15. In the following descriptions, the direction of the axis 20C of the mandrel 20 will be referred to as the horizontal direction. Mandrel raising/lowering cylindrical devices 22 are fixed to the left and right cylindrical device brackets 21 to be oriented in the vertical direction (direction orthogonal to the prepreg mounting surface 10P), and mandrel-mounting/dismounting blocks 24 are fixed to piston rods 23 of the left and right mandrel raising/lowering cylindrical devices 22, respectively. The left and right mandrel-mounting/dismounting blocks 24 support left and right shaft projections 20X which project from shaft portions of the mandrel 20 at both ends thereof in a manner to allow the left and right shaft projections 20X to be attached to and detached from the left and right mandrel-mounting/dismounting blocks 24, respectively, and to be freely rotatable. FIG. 9 shows the shape of the mandrel 20 alone. The cylindrical device brackets 21, the mandrel raising/lowering cylindrical devices 22, the piston rods 23 and the mandrel-mounting/dismounting block 24, which are supported by the forward/rearward moving frame 15, constitute a relative mandrel moving mechanism which moves the mandrel 20 up and down relative to the plate 10.

Figure 5:
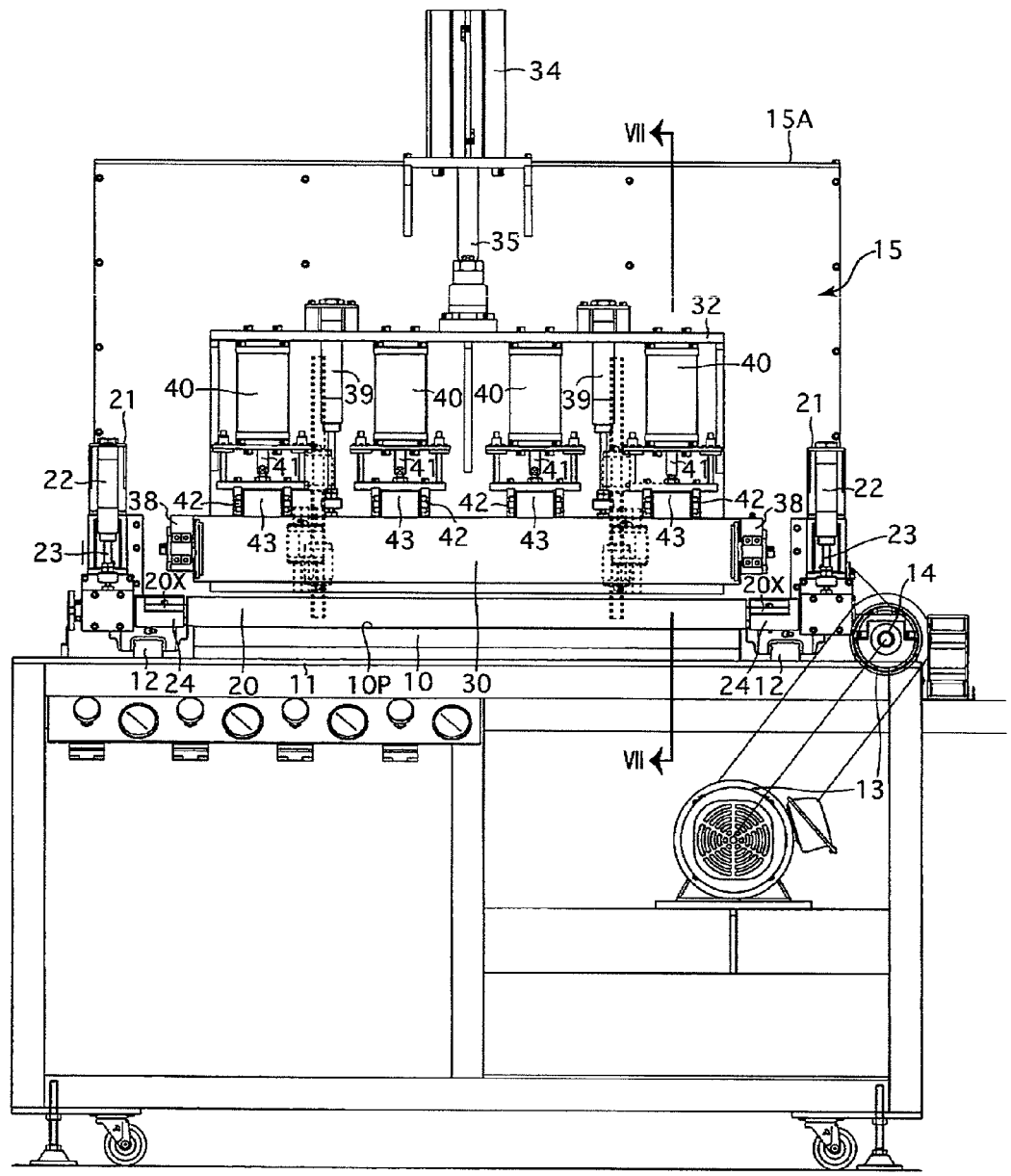
FIG. 5 is a front elevational view of an embodiment of a prepreg winding apparatus according to the present invention.
Figure 6:
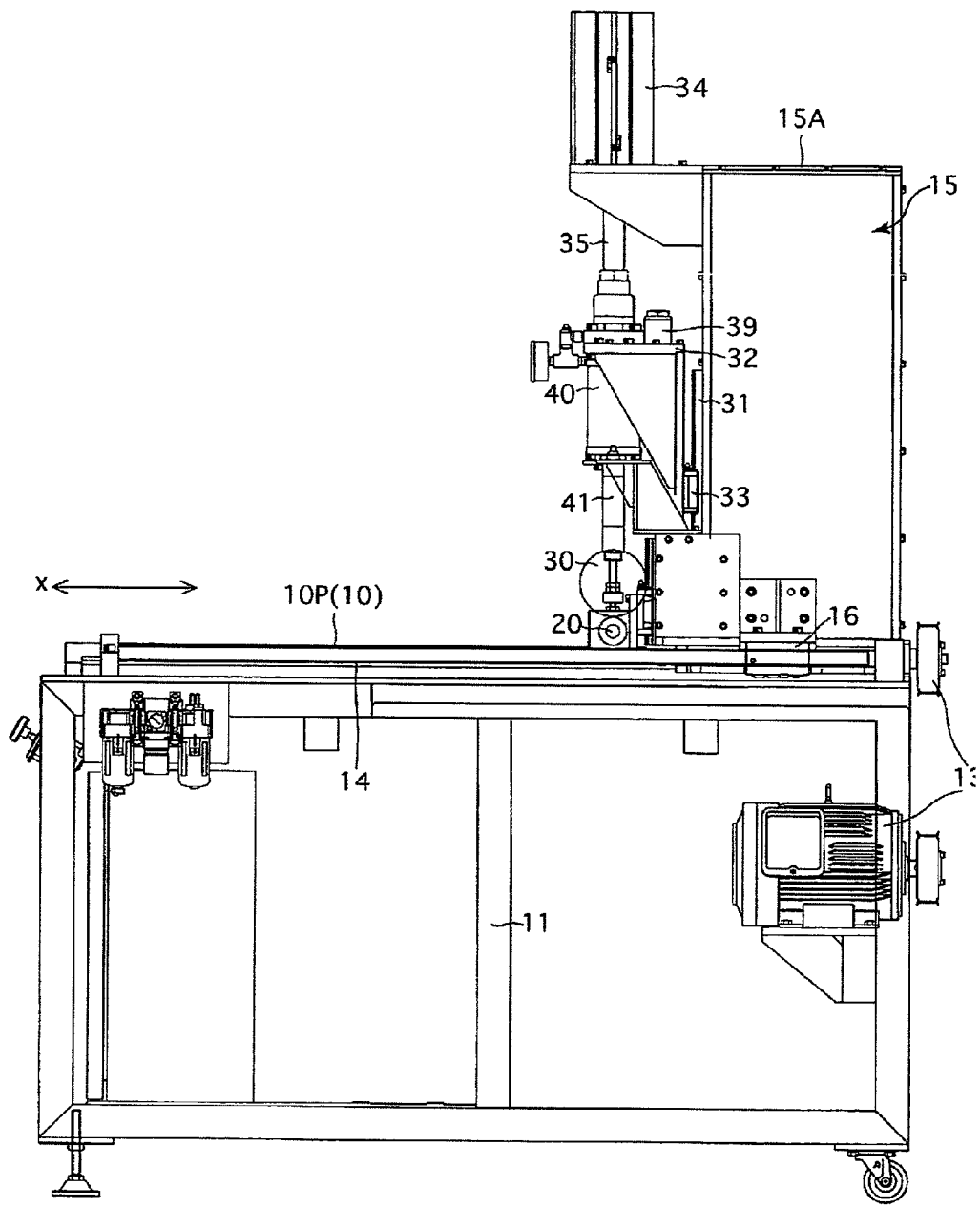
FIG. 6 is a side elevational view of FIG. 5.
Figure 7:
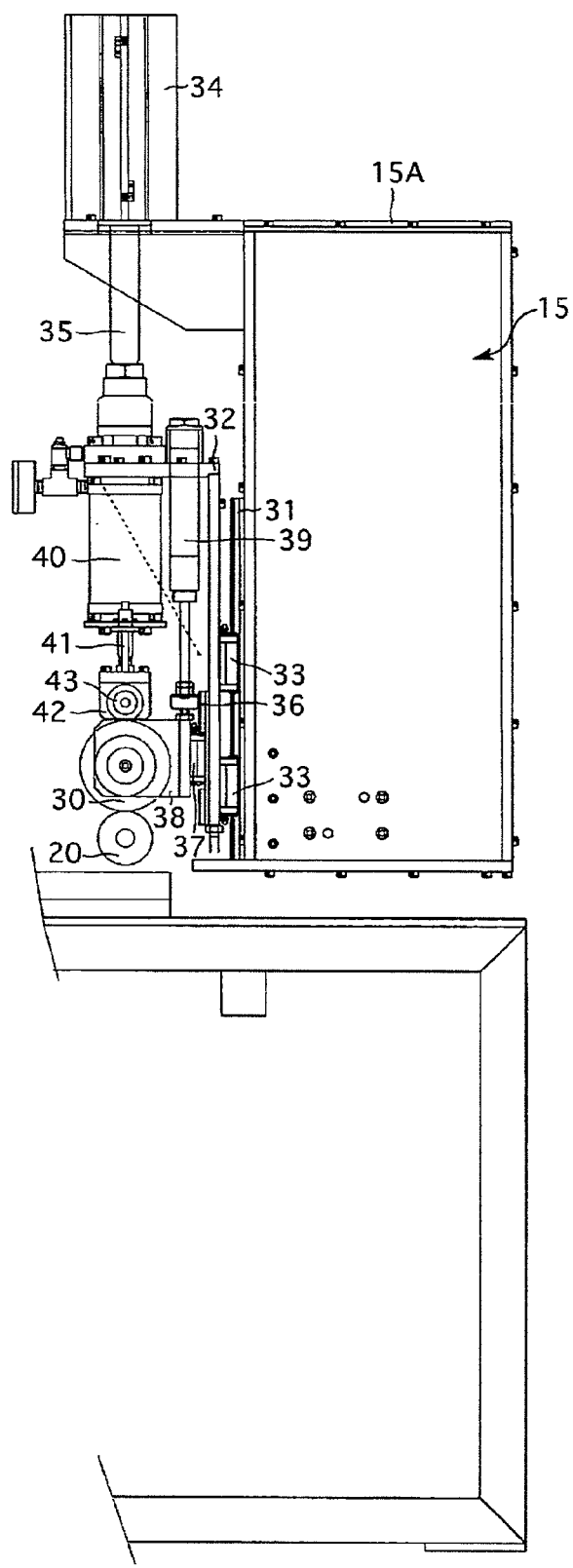
FIG. 7 is a sectional view taken along the line VII-VII shown in FIG. 5.

As shown in FIGS. 5 through 7, a left-right pair of guide rails 31 which extend in the vertical direction are fixed to the forward/rearward moving frame 15, and an elevating frame 32 is supported by the guide rails 31 via guide pieces 33 to be freely move up and down. An elevating-frame raising/lowering cylindrical device 34 which extends in the vertical direction is fixed to a top frame 15A of the forward/rearward moving frame 15, and a piston rod 35 of the elevating-frame raising/lowering cylindrical device 34 is fixed to the elevating frame 32.

As shown in FIG. 7, a left-right pair of guide rails 36 which extend in the vertical direction are fixed to the elevating frame 32, and a press roll bracket 38 which supports the press roll 30 in a manner to allow the press roll 30 to rotate freely is supported by the guide rails 36 via guide pieces 37 to be freely movable up and down.

Figure 8:
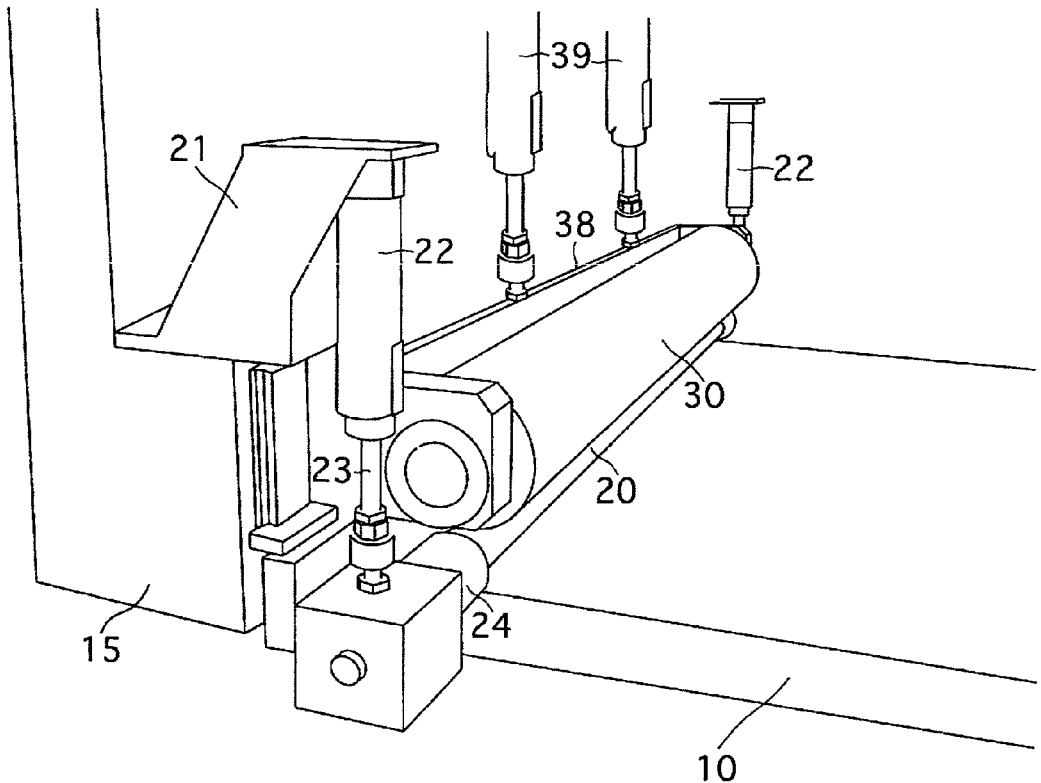
FIG. 8 is a perspective view of FIG. 5.

A plurality (four in FIG. 5) of pressure-roll pressure adjustment cylindrical devices 40 are fixed to the elevating frame 32 to extend in the vertical direction and to be spaced at intervals in the direction of the axis 30C of the press roll 30. A pressure roll support bracket 42 is fixed to a piston rod 41 of each pressure-roll pressure adjustment cylindrical device 40, and a pressure roll 43 which comes into elastic contact with the periphery of the press roll 30 from above is supported by this pressure roll support bracket 42 to be freely rotatable. The contact pressure between the pressure rolls 43 and the press roll 30 can be adjusted using the pressure-roll pressure adjustment cylindrical devices 40. Press-roll raising/lowering cylindrical devices 39 are further installed between the elevating frame 32 and the press roll brackets 38, and the relative position of the press roll 30 in the vertical direction when the elevating frame 32 moves up is maintained by the press-roll raising/lowering cylindrical devices 39, which makes it possible to prevent the press roll 30 from dropping to the cylinder bottom dead center. In FIG. 8, the pressure rolls 43 are not shown while the press-roll raising/lowering cylindrical devices 39 are shown.

The above-mentioned guide rails 31, elevating frame 32, guide pieces 33, elevating-frame raising/lowering cylindrical device 34 and piston rod 35 constitute a relative press-roll raising/lowering mechanism which makes the press roll 30 move toward and away from the mandrel 20, while the above-mentioned pressure-roll pressure adjustment cylindrical devices 40, piston rods 41, pressure roll support brackets 42 and pressure rolls 43 constitute a pressing force variable mechanism which varies the pressing force of the press roll 30 against the mandrel 20.

The present embodiment of the prepreg winding mechanism that has the above described structure is provided on the machine casing 11 with the forward/rearward moving frame (double-roll block) 15 that is movable in the forward/rearward direction (the moving direction of the prepreg mounting surface 10P of the plate 10), and the mandrel 20 and the press roll 30 are supported to be movable up and down independently of the forward/rearward moving frame 15. The mandrel 20 moves up and down relative to the plate 10 by the cylindrical device brackets 21, the mandrel raising/lowering cylindrical devices 22, the piston rods 23 and the mandrel-mounting/dismounting block 24 (by the relative mandrel moving mechanism), while the press roll 30 moves up and down relative to the mandrel 20 (the plate 10) by the guide rails 31, the elevating frame 32, the guide pieces 33 and the press-roll raising/lowering cylindrical devices 39 (by the relative press-roll raising/lowering mechanism). In other words, the mandrel 20 and the press roll 30 can independently move up and down relative to the plate 10. In addition, the contact pressure of the press roll 30 against the mandrel 20 can be varied in the direction of extension of the press roll 30 (the mandrel 20) by the plurality of pressure-roll pressure adjustment cylindrical devices 40 (the pressure rolls 43), the pressure forces of which are mutually independently adjustable and which are arranged in the direction of the axis 30C of the press roll 30.

Accordingly, the prepreg winding method of the present invention that has been described with reference to FIGS. 1 and 2 can be practiced with reliability by mounting the prepreg P (the laminated prepreg PP) on the prepreg mounting surface 10P of the plate 10, moving the forward/rearward moving frame 15 in the forward/rearward direction to wind the leading end of the prepreg P (the laminated prepreg PP) around the mandrel 20 while changing the height of the mandrel 20 and the press roll 30 (initial winding), thereafter making the mandrel 20 pressed against the plate 10, making the press roll 30 pressed against the mandrel 20 and moving the forward/rearward moving frame 15 in the forward/rearward direction.

In addition, the mandrel 20, the periphery of which the prepreg P (or the laminated prepreg PP) is wound around a required number of turns, is removed from the forward/rearward moving frame 15 after the shaft projections 20X that project from both ends of the mandrel 20 are detached from the mandrel-mounting/dismounting blocks 24, thereby becoming available for the subsequent thermal curing process.

It is desirable for the pressing force variable mechanism for the press roll (the pressure-roll pressure adjustment cylindrical devices 40, the piston rods 41, the pressure roll support brackets 42 and the pressure rolls 43) in the above described embodiment to be installed, but can be omitted. Namely, the method according to the present invention can be applied even if the press roll 30 is rotatably supported at a fixed position on the elevating frame 32.

INDUSTRIAL APPLICABILITY

The prepreg winding method and apparatus according to the present invention can be widely utilized for the production of FRP cylinders in various industrial fields.

REFERENCE SIGNS LIST

P Prepreg
PP Laminated prepreg
H Separating sheet
B Double-roll block
10 Plate
10P Prepreg mounting surface
11 Machine casing
12 Guide rail
13 Rotary drive system
14 Feed screw
15 Forward/rearward moving frame
20 Mandrel
20C Axis 20X Horizontal shaft projection
21 Cylindrical device bracket
22 Mandrel raising/lowering cylindrical device
23 Piston rod
24 Mandrel-mounting/dismounting block
30 Press roll
30C Axis
31 Guide rail
32 Elevating frame
33 Guide piece
34 Elevating-frame raising/lowering cylindrical device
35 Piston rod
36 Guide rail
37 Guide piece
38 Press roll bracket
39 Press-roll raising/lowering cylindrical device
40 Pressure-roll pressure adjustment cylindrical device
41 Piston rod
42 Pressure roll support bracket
43 Pressure roll

The invention claimed is:

1. A prepreg winding method comprising:

a step of preparing a plate, a mandrel which is movable toward and away from said plate, and a press roll which is movable toward and away from said mandrel and has an axis parallel to said mandrel;

a step of mounting a laminated prepreg on said plate, said laminated prepreg being formed by layering a plurality of prepregs with a separating sheet interposed between adjacent prepregs, each prepreg formed by impregnating reinforced fibers with a thermosetting resin sheet;

a step of winding a leading end of said laminated prepreg, mounted on said plate, around said mandrel, and making a pressing force act on said plate and said mandrel therebetween with said laminated prepreg sandwiched between said plate and said mandrel and making a pressing force act on said mandrel and said press roll therebetween with said laminated prepreg sandwiched between said mandrel and said press roll; and a step of winding said laminated prepreg around said mandrel by rotating said mandrel and said press roll, while removing each said separating sheet during winding of said layered prepregs around said mandrel, by supplying a relative moving force between said plate and said mandrel with said mandrel and said press roll pressed against each other, said relative moving force acting in a direction orthogonal to said axis of said mandrel with respect to a plan view.

2. The prepreg winding method according to claim 1, wherein said mandrel is cylindrical in shape.

3. A prepreg winding apparatus comprising:

a plate having a mounting surface on which a prepreg formed by impregnating reinforced fibers with a thermosetting resin sheet is mounted; and a forward/rearward moving frame which is movably supported on said plate, said forward/rearward moving frame being movable in a direction parallel to said mounting surface of said plate, and including:

a mandrel supported to be rotatable within said forward/rearward moving frame about an axis of said mandrel that is parallel to said prepreg mounting surface of said plate and orthogonal to the moving direction of said forward/rearward moving frame;

a relative mandrel moving mechanism which moves said mandrel toward and away from said mounting surface of said plate;

a press roll which maintains the axis thereof parallel to said axis of said mandrel and is movable toward and away from said mandrel;

a plurality of pressure rolls which press said press roll toward said mandrel at different positions, with respect to a direction of said axis of said press roll, and press said mandrel, via said press roll, in a direction so that said mandrel approaches said plate, a relative press-roll raising/lowering mechanism which raises and lowers said press roll with respect to said plate and said mandrel; and a pressure roll pressure adjustment cylinder, which varies a pressing force for pressing said press roll against said mandrel by adjusting contacting pressures between said pressure rolls and said press roll;

wherein, when said forward/rearward moving frame moves relative to said plate, said mandrel and said press roll move relative to said mounting surface of said plate in a direction orthogonal to said axis of said mandrel with respect to a plan view.

4. A prepreg winding method comprising:

a step of preparing a plate, a mandrel movable toward and away from said plate, a press roll, made of an elastic material, which is movable toward and away from said mandrel, and has an axis parallel to said mandrel, a plurality of pressure rolls which press said press roll toward said mandrel at different positions, with respect to a direction of said axis of said press roll, and press said mandrel, via said press roll, in a direction so that said mandrel approaches said plate, and a pressure-roll pressure adjustment cylinder which varies a pressing force for pressing said press roll against said mandrel by adjusting respective contacting pressures between said pressure rolls and said press roll;

a step of mounting a prepreg on said plate, said prepreg being formed by impregnating reinforced fibers with a thermosetting resin sheet;

a step of winding a leading end of said prepreg mounted on said plate around said mandrel, and making a pressing force act on said plate and said mandrel therebetween with said prepreg sandwiched between said plate and said mandrel and making a pressing force act on said mandrel and said press roll therebetween with said prepreg sandwiched between said mandrel and said press roll;

a step of elastically contacting said plurality of pressure rolls onto the surface of said press roll;

a step of varying said pressing force for pressing said press roll against said mandrel by adjusting said respective contacting pressures between said pressure rolls and said press roll, while said pressure rolls are elastically contacting the surface of said press roll;

a step of winding said prepreg around said mandrel by rotating said mandrel and said press roll by supplying a relative moving force between said plate and said mandrel with said mandrel and said press roll pressed against each other, said relative moving force acting in a direction orthogonal to said axis of said mandrel, with respect to a plan view, while said pressing force is acting on said plate and said mandrel therebetween and acting on said mandrel and said press roll therebetween.

5. The prepreg winding method according to claim 4, wherein said prepreg comprises a laminated prepreg formed by layering a plurality of said prepregs with a separating sheet interposed between adjacent prepregs, and wherein said prepreg winding method includes a step of removing said separating sheet during winding of said prepreg around said mandrel.

6. The prepreg winding method according to claim 4, wherein said mandrel is cylindrical in shape.

\* \* \* \* \*